US007593994B2

(12) United States Patent
Milligan et al.

(10) Patent No.: US 7,593,994 B2
(45) Date of Patent: Sep. 22, 2009

(54) GENERATING A DYNAMIC WEB SERVICE AND DYNAMIC SERVICE SURROGATE FOR LEGACY APPLICATION COMPONENTS

(75) Inventors: Andrew D. Milligan, Redmond, WA (US); Harris Syed, Kirkland, WA (US); John D. Doty, Seattle, WA (US); Max Attar Feingold, Bellevue, WA (US); Saji Abraham, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 932 days.

(21) Appl. No.: 11/074,619

(22) Filed: Mar. 8, 2005

(65) Prior Publication Data
US 2006/0206567 A1 Sep. 14, 2006

(51) Int. Cl.
*G06F 15/16* (2006.01)
(52) U.S. Cl. .................. 709/206; 709/232; 709/246
(58) Field of Classification Search ............ 709/223, 709/206
See application file for complete search history.

(56) References Cited

U.S. PATENT DOCUMENTS

| 6,049,819 | A  | * | 4/2000  | Buckle et al. ............. 709/202 |
| 6,792,605 | B1 |   | 9/2004  | Roberts et al. ............ 719/313 |
| 6,993,585 | B1 | * | 1/2006  | Starkovich et al. ......... 709/228 |
| 7,188,163 | B2 |   | 3/2007  | Srinivasan |
| 7,266,550 | B2 |   | 9/2007  | Dumitru |
| 7,284,039 | B2 | * | 10/2007 | Berkland et al. ........... 709/219 |
| 2002/0116454 | A1 | * | 8/2002 | Dyla et al. ................ 709/203 |
| 2002/0152210 | A1 | * | 10/2002 | Johnson et al. ............. 707/9 |
| 2002/0178290 | A1 |   | 11/2002 | Coulthard et al. ........... 709/246 |
| 2003/0105884 | A1 | * | 6/2003 | Upton ..................... 709/318 |
| 2004/0117439 | A1 |   | 6/2004  | Levett |
| 2005/0091639 | A1 | * | 4/2005 | Patel ..................... 717/114 |
| 2006/0206599 | A1 |   | 9/2006  | Milligan |

OTHER PUBLICATIONS

Huy, HP. IEEE International Conference on Web Services. Web Service Gateway A step forward to e-business [online], 2004 [retrieved on Nov. 15, 2008]. Retrieved from the Internet:<URL:http://ieeexplore.ieee.org/stamp/stamp.jsp?arnumber=01314793>.*

(Continued)

*Primary Examiner*—William C Vaughn, Jr.
*Assistant Examiner*—Adam Cooney
(74) *Attorney, Agent, or Firm*—Workman Nydegger

(57) ABSTRACT

Example embodiments of the present invention provide a mechanism for allowing developers to define new interfaces and insert custom translational code that implements these new interfaces for legacy components that otherwise cannot communicate in a web service environment. These new interfaces are then exposed to the web service client in such a way that abstracts the web service client from the legacy components interfaces. The objects that implement the new interfaces are referred to herein as "service surrogates" and the new interfaces will be commonly referred to as a, "surrogate interfaces." These surrogate interfaces may be initialized along with an instance of the service surrogate upon startup of an application that offers the services. In addition, a dynamic web service can simultaneously run along with the service surrogate for those services that may not need the features offered by the service surrogates.

19 Claims, 5 Drawing Sheets

OTHER PUBLICATIONS

Naveen, Yajaman. Microsoft Corporation. Patterns & Practices. Web Service Facade for Legacy Applications [online], Jun. 2003 [retrieved on Nov. 15, 2008]. Retrieved from the Internet:<URL:http://msdn.microsoft.com/en-us/library/ms979218.aspx>.*

Microsoft, *Platform SDK: Microsoft Interface Definition Language (MIDL)*, Oct. 2004, pp. 1-2, available at http://msdn.microsoft.com/library/default.asp?url=/library/en-us/midl/midl/call_as.asp (a copy is attached hereto).

Microsoft, *The OLE Handler*, date unknown—Copyright 2005 Microsoft Corporation, available at http://msdn.microsoft.com/library/default.asp?url=/library/en-us/com/htm/handlers_8njm.asp (a copy is attached hereto).

Bisbal, Jesús et al. "Legacy Information System Migration: A Brief Review of Problems, Solutions and Research Issues," *Computer Science Department Report,* No. 38, Trinity College, Dublin, Ireland, 1999, pp. 1-18.

Li, M. et al. "Leveraging Legacy Codes to Distributed Problem-Solving Environments: a Web Services Approach." *Software—Practice and Experience,* vol. 34, pp. 1397-1309. Published online Aug. 25, 2004 in Wiley InterScience (http://www.interscience.wiley.com).

* cited by examiner

GENERATING A DYNAMIC WEB SERVICE AND DYNAMIC SERVICE SURROGATE FOR LEGACY APPLICATION COMPONENTS

CROSS-REFERENCE TO RELATED APPLICATIONS

N/A

BACKGROUND OF THE INVENTION

1. The Field of the Invention

The present invention generally relates to web services. More specifically, the present invention provides for generating a dynamic web service and dynamic service surrogate for legacy application components that are not developed to communicate within a web service environment. The service surrogate also advantageously allows a developer tighter control over the interface exposed to web service clients by providing an abstraction layer between the web service client and the legacy interface.

2. Background and Related Art

Computer systems and related technology affect many aspects of society. Indeed, the computer system's ability to process information has transformed the way we live and work. Computer systems now commonly perform a host of tasks (e.g., word processing, scheduling, database management, etc.) that prior to the advent of computer systems were performed manually. More recently, computer systems have been coupled to one another to form computer networks over which the computer systems can communicate electronically to share data. Web services have been a driving force in advancing such communications between computer systems and are turning the way we build and use software inside-out.

Web services let applications share data, and—more powerfully—invoke capabilities from other applications without regard to how those applications were built, what operating system or platform they run on, and what devices are used to access them. Web services are invoked over the Internet by means of industry-standard protocols including SOAP (Simple Open Access Protocol), XML (eXtensible Markup Language), UDDI (Universal Description Discovery Integration), WSDL (Web Service Description Language), etc. Although web services remain independent of each other, they can loosely link themselves into a collaborating group that performs a particular task.

Often, electronic communication on a web service network includes a client computer system (hereafter referred to as a "client") requesting access to a network service (e.g., web services) at a server computer system (hereinafter referred to as a "server," "service," or "web service"). Accordingly, the client sends a request to the service for particular access to its system resources, wherein if the client is authorized and validated, the service responds with a response message providing the desired information. Of course, other messaging patterns between client and service are available and include simple singleton messages as well as more sophisticated multi-message exchanges, e.g., notifications, solicit-response, pub-sub patterns, polling, kick-push, queuing, and others. Further, these types of communication are governed by various requirements and capabilities defined by both the client and the service in contracts for distributed systems (e.g., web services).

A contract is an expression of visible aspects of a service (or client) behavior. A contract is represented by a mixture of machine-readable and human languages. Besides the obvious opportunity for additional precision, machine-readable languages enable tooling to construct partial service implementations, automate service deployment, audit/validate messages exchanged, manage services, and enable a host of other network-related functions. Due, however, to limitations in the expressive power of machine-readable languages, human languages remain an important component of contracts—principally to describe message and message exchange pattern semantics.

Network Protocol Description Languages (e.g., WSDL) provide an overall wrapper or specification for describing contracts (e.g., web services Contracts) in a common or standard language. Such specifications make it easy for developers and developer tools to create and interpret contracts. These Network Protocol Description Languages (hereinafter referred to as "NPDL") have extensive tooling suites, which in large part accounts for their popularity.

Prior to the advent of web services, and over many years, a significant number of distributed applications have been written using legacy component based architectures from various vendors (e.g., COM (Component Object Model), DCOM (Distributed Component Object Model), CORBA (Common Object Request Broker Architecture)). With the arrival and advancement of standards based web services, however, there is interest in exposing the business logic from these legacy components as web services. As an example, and irrespective of the approach followed, the intention is typically to take an application component such as the one that supports the following interface:

```
interface IStockSystem : IDispatch {
    HRESULT GetProductDescription(
        [in] BSTR ProductID,
        [out, retval] BSTR *ProdDesc);
    HRESULT GetProductInventory(
        [in] BSTR ProductID,
        [out, retval] short *ProdCount);
};
``` and produced from that component definition, a corresponding web service layer with a couple of operations illustrated in the following WSDL fragment:

```
<wsdl:portType name="StockSystem">
    <wsdl:operation name="GetProductDescription">
        <wsdl:input message="tns:GetProductDescriptionIn" />
        <wsdl:output message="tns:GetProductDescriptionOut" />
    </wsdl:operation>
    <wsdl:operation name="GetProductInventory">
        <wsdl:input message="tns:GetProductInventoryIn" />
        <wsdl:output message="tns:GetProductInventoryOut" />
    </wsdl:operation>
</wsdl:portType>
```

To date, there are only a couple of primary patterns or approaches that have been followed for converting or using legacy components within a web service environment. One approach is a migration or modification, which requires a developer to modify the component source code to add web service support. When the application is compiled and executed, the application will start with the appropriate web service support while still allowing traditional clients to connect to the underlying application.

Another approach is a tooling and metadata driven approach, which produces a static wrapping service. Rather than requiring components source code modification, this approach uses a more external approach to examine existing registered metadata for a component to determine the service that component should offer. This produces a static web service wrapper that is external to but, at least initially, consistent with the underlying unmodified component.

Although the above modified and static approaches have enabled the business logic of legacy components to be accessed in a web service environment, there are several shortcomings and problems associated with both of these approaches. For example, since the modification approach requires source code modification—even when there is no desire to change the business logic—this is a development task rather then a simple administrative procedure. Accordingly, such a task is beyond the scope of a typical administrator role and requires an additional skill set. In addition, the development modification to enable web services may not be available using the original coding environment. For instance, in the case of modifying a component written using a legacy language that is no longer supported, the component first has to be ported to a current language. Accordingly, a modification that looks initially like adding an attribute to a method is in fact a migration to a different language, runtime, and development environment.

In the static tooling approach, a problem exists when the underlying component is modified or a new version deployed. In such instance, the change will not automatically be reflected in the wrapping service until the service is regenerated. In addition, for web service operations, there is an explicit dependency between the service and the underlying component. Accordingly, care must be taken to ensure that the lifetimes of the component and the web service are synchronized (i.e., the wrapping service requires the component to be active and the component requires the wrapper to be active). Further, depending upon the environment and the external nature of the wrapper, there is typically an additional component to be deployed and administered. In other words, if the components are moved to another machine, the wrapper components must also be identified and moved accordingly.

One approach to solving the deficiencies and drawbacks of the above-identified modified and static approaches is to dynamically generate web service as described herein and as described in greater detail in U.S. patent application No. 11/075417 titled "DYNAMIC SERVICE GENERATION FOR LEGACY COMPONENTS," filed Mar. 8, 2005, which is incorporated herein by reference. This approach, however, (as well as the above-described systems) still has various drawbacks. For example, one problem with these systems is that there are existing distributed applications with interfaces that cannot changed or may not be appropriate for exposure as web services for any number of reasons. For instance, they may have calls that require parameters that cannot be translated into web service messages, e.g., SOAP messages. Alternatively, or in conjunction, they may have been written in such a way as to require method call roundtrips for a single operation, which is not supported by typical web services.

As an example of inappropriate interface for exposing as a web service, take the following interface:

```
[object, uuid(a0753298-46bc-444e-a89b-b66d8a0cec57)]
interface IOrderDescription : IUnknown
{
    HRESULT GetProductName([out] BSTR *ppszName);
    HRESULT GetQuantity([out] DWORD *pdwQuantity);
    HRESULT GetNegotiatedPrice([out] DWORD *pdwPrice);
}
```

-continued

```
[object, uuid(5605102f-d914-4633-a974-4369a1af8db9)]
interface IComPlusObject : IUnknown
{
    HRESULT PlaceOrder([in] IOrderDescription *pOrderDescription);
}
```

As shown, the IComPlusObject is exposed by an existing COM object and takes as its single parameter an object (i.e., IOrderDiscription) that implements the IComPlusObject. Note, however, that the IComPlusObject can not be exposed as a web service as-is, since typical web service infrastructures do not support method calls that take objects as parameters.

In order to compensate for such deficiencies, current practice provides for a rewrite of at least the component and component interface (and possible the entire application) as described above in the modified approach. Nevertheless, as mentioned above, this rudimentary approach for creating new services via a rewrite is a significant undertaking. Since the client and service are tightly coupled through the use of a same instances of the same interface, both the client and server must be updated upon changes to the service. In addition, this advanced rewrite will typically not be within the skill set of most users.

For at least the foregoing reasons, there exists a need for providing web services and business logic for legacy components without requiring a developer to modify the underlying component source code, allowing for component modification or versioning, as well as supporting the explicit dependency between the service and the underlying component. In addition, there exists a need to providing mechanisms that allow developers to create interfaces for component interfaces that are inoperable or inefficient, without having to rewrite the application components or component interfaces.

BRIEF SUMMARY OF THE INVENTION

The above-identified deficiencies and drawbacks of typical systems that provide services and business logic for legacy components in a Web Service environment are overcome through exemplary embodiments of the present invention. For example, the present invention provides mechanisms for supporting web services via a custom object that was created by a developer for legacy components that communicate through a legacy interface that is not developed to communicate in a web service environment. The custom object allows the developer tight control over the web service's interoperability, robustness, and efficiency, without requiring a rewrite of the legacy components or component interfaces.

For example, embodiments of the present invention provide for receiving from a web service client, a request to access a service provided by an application with legacy components. The legacy components communicate using a legacy interface that is not developed to communicate in a web service environment. Thereafter, the request is identified as corresponding to a service controlled by a service surrogate, which is a custom object created by a developer to expose a surrogate interface as an abstraction between the web service client and the legacy interface. At least a portion of the request is passed via the surrogate interface to an instance of the service surrogate for further processing. The service surrogate is configured to process at least a portion of the request by one or more of a call into one or more legacy components, a call into the instance of the service surrogate, or a call into other systems outside the application and instance of the service surrogate.

Other exemplary embodiments provide for the initialization of a custom object that was created by a developer. In this embodiment, a request to initialize an application is received, wherein the application includes one or more legacy components for providing a service. Further, the legacy components communicate using a legacy interface that is not developed to communicate in a web service environment. Based on the request to initialize the application, an instance of a service surrogate is identified as needing to be generated, wherein the service surrogate is a custom object created by the developer to expose a surrogate interface as an abstraction between a web services client and the legacy interface. Thereafter, metadata is accessed, which describes the surrogate interface that will be exposed to the web service client. This metadata is then used to generate the instance of the service surrogate, which includes the surrogate interface. The instance of the service surrogate is further configured to process at least a portion of a request from the web service client by one or more of a call into the one or more legacy components, a call into the instance of the service surrogate, or a call into other systems outside the application and the instance of the service surrogate.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention extends to methods, systems, and computer program products for generating a dynamic web service and an instance of a surrogate service for legacy application components that are not developed, designed, or coded to communicate within a web service environment. The surrogate service being a custom object or code that allows a developer tighter control over the web service's interoperability, robustness, and efficiency, without requiring a rewrite of the legacy components or interfaces. The embodiments of the present invention may comprise a special purpose or general-purpose computer including various computer hardware components or modules, as discussed in greater detail below.

In a first example embodiment, the present invention provides a mechanism that allows an administrative event to trigger or cause the generation of a dynamic web service during initialization of legacy application components. Similar to other types of static tooling approaches, the dynamic approach—as supported herein—uses available metadata describing an interface for communicating with legacy components. Rather than generating and manifesting the web service via tooling on one-time or occasional basis, example embodiments provide for the generation of the web service by the supporting infrastructure as a standard part of application initialization. Upon stopping the application, a termination sequence is provided that stops the corresponding dynamic web service and deletes the web service description used to generate the dynamic web service. Accordingly, every time the application is started the available metadata will need to be consulted and a consistent service will be built on-the-fly.

Figure 1A:
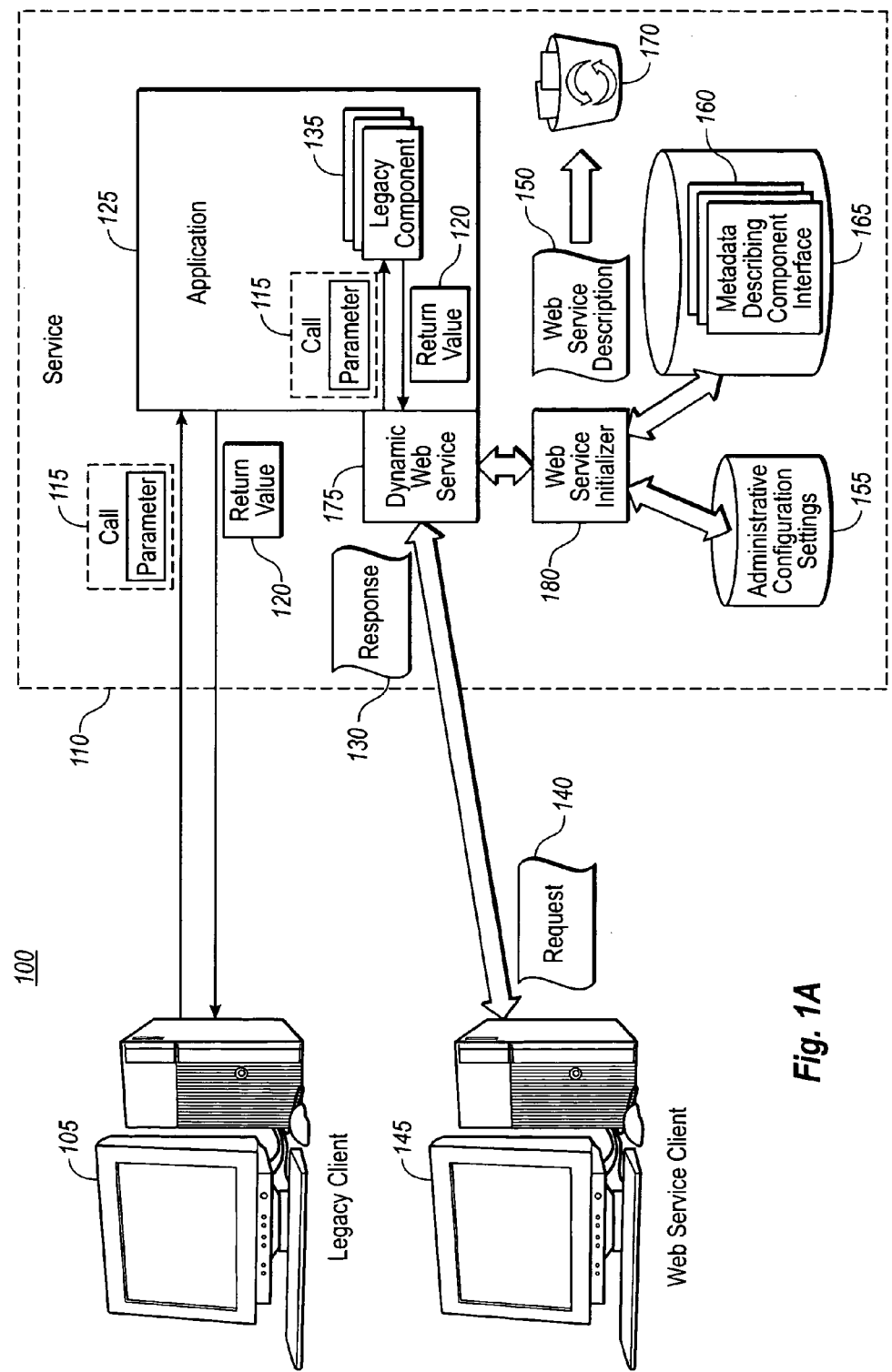
FIG. 1A illustrates a distributed system configured to create a dynamic web service in accordance with example embodiments of the present invention.

FIG. 1A illustrates various exemplary embodiments as described above. As shown, a distributed system 100 is provided that supports both web service clients 145 and legacy clients 105, thereby allowing access to a service 110 oriented application 125. More specifically, a service 110 is provided with an application 125 that includes legacy components 135. Example embodiments allow an administrator (not shown) to set administrative configuration settings 155, which indicate that a dynamic web service 175 should be generated upon startup of application 125. Accordingly, based on the administrative configuration settings 155, upon application 125 startup (and subject possibly to other configurations pulled from an application specific configuration file) a web service initializer 180 will access metadata 160 from catalogue database 165.

Note that example embodiments allow for several ways for the initialization of application 125 (and the corresponding dynamic web service 175). For example, the request for initialization of application 125 may be received through input from an administrator user interface. Other example embodiments provide for automatically initializing the application 125 upon receipt of a request 140 (or other similar type requests) for access to services provided by application 125. Of course other well known ways of initialization applications 125 are also available to the present invention. Accordingly any specific manner or process for initializing application 125 is for illustrative purposes only and is not meant to limit or otherwise narrow the scope of the present invention unless explicitly claimed.

Regardless of how the application 125 is initialized, as previously mentioned, upon initialization metadata describing component interface 160 is accessed. This metadata 160 is information for how dynamic web service 175 is to communicate with the legacy component 135. In other words, the metadata 160 indicates, among other things, one or more of: what calls 115 are required for the legacy component 135; what parameters 115 to pass to the legacy component 135; what order the parameters 115 should be passed in; and a message exchange pattern, which indicates, e.g., if a return value 120 is to be received from the legacy component 135. Note that not all calls 115 will include parameters 115. For example, an operation of FormatAllAvailableDisks( ) and other calls require no parameters. Accordingly, the metadata 160 may or may not have details on parameters 115 to pass to the legacy components 135, depending of course on the type of call 115 to be made.

In any event, upon accessing the metadata 160, web service initializer 180 can generate a web service description 150 or contract (e.g., a WSDL document). In addition, the web service initializer 180 will start the dynamic web service 175 during runtime using the web service description 150. In addition, it may be necessary to use the web service description 150 to create web service clients 145 consistent therewith. Note that although the web service description 150 generated was used to create the dynamic web service 175, such an event is not critical to the present invention. In other words, the web service initializer 180 upon accessing the metadata 160 may automatically generate the dynamic web service 175, without the use of the web service description 150. Accordingly, the use of the web service description 150 for generating the dynamic web service 175 is for illustrative purposes only and is not meant to limit or otherwise narrow the scope of the present invention unless explicitly claimed.

Once the dynamic web service 175 is created and the legacy components 135 are active, a web service client 145 can make a request 140 for accessing services provided by legacy components 135. The request 140 may include such things as operations for requesting service offered by the legacy component 135 and/or the parameters 115 that the legacy component 135 needs, if any. Upon receiving request 140 and based on the operations within the request, dynamic web service 175 examines the request's 140's content and makes the appropriate calls 115 with the appropriate parameters (if any) to the legacy components 135. In other words, dynamic web service 175 acts as a translator between a common web service request message 140 (e.g., an XML document), and the appropriate calls and required parameters 115, if any, for communicating with the legacy components 135.

As previously mentioned, in addition to the appropriate calls 115 and required parameters 115, if any, the dynamic web service 175 should be configured to know the appropriate message exchange pattern for the legacy component 135. Accordingly, if a return value 120 is required, the dynamic web service 175 will expect such a return. This return value 120 can then be formatted within an appropriate web service response 130, which is generated by the dynamic web service 175. Note that although the message exchange pattern for this example is a request-response, other message exchange patterns are also available to the present invention. Accordingly, the use of any particular type of message exchange pattern as described herein is for illustrative purposes only and is not meant to limit or otherwise narrow the scope of the present invention unless explicitly claimed.

Other example embodiments provide for a termination sequence for application 125. When the legacy application 125 is shut down or stopped, exemplary embodiments provide for terminating the dynamic web service 175 and deleting the web services description 150, e.g., by sending it to the recycling bin 170. Accordingly, since the web service description 150 is not persisted, and/or reused, there will be no inconsistencies if legacy components 175 are modified or updated, versions are provided.

Note that the present invention also supports legacy client 105. Accordingly, the legacy client 105 can make the appropriate calls with the appropriate parameters 115, if any, directly to the legacy application 125. The return values 120 (if any) can also be delivered directly to the legacy client 105 from the legacy application 125.

As previously mentioned, although the above described dynamic web service overcomes current problems associated with the modified and static approaches of web services for legacy components, there is still a need for enhancement or improvement of this dynamic system. For example, as described above, in may not be possible to change an interface or the interface may not be appropriate for exposure as web services for a number of reasons. Accordingly, exemplary embodiments of the present invention provide a mechanism for allowing developers to define new interfaces and insert custom translational code that implements these new interfaces. These new interfaces are then exposed to the web service client in such a way that abstracts the web service client from the legacy components interface. The objects that implement the new interfaces are referred to herein as "service surrogates" and the new interface will be commonly referred to as a "surrogate interface."

As an example to how a service surrogate can be implemented, recall the example from the background section wherein the IComPlusObject took an object reference as a single parameter. As previously mentioned, because typical web service infrastructures do not support methods calls that take objects as parameters, the IComPlusObject would fail and this service would be unavailable to non-legacy clients. Exemplary embodiments, however, provide mechanisms that allow the IComPlusObject interface described above to be exposed as a web service by allowing a user or developer to define a service surrogate that implements the following interface:

```
[ServiceContract]
interface ISurrogateInterface
{
    void PlaceOrder(string productName, int quantity, int price);
}
```

The developer may then implement the new PlaceOrder function by creating a service surrogate to fill in the IOrderDescription parameter to the legacy COM object's PlaceOrder method.

Note that the surrogate interface that the service surrogate exposes to a web service client need not be in any way related to the legacy interface for the legacy components. For example, the surrogate interface may have a different number of calls than the legacy interface and the service surrogate calls may map to existing legacy calls in any way. In fact, as will be described in greater detail below, the service surrogate can be configured to process requests or portions thereof without calling into the legacy components, or by way of processing a portion of the request and relying on the legacy components to supply other needed functions. Alternatively, or in conjunction, the service surrogate may be configured to process at least a portion of requests through other systems outside of the applications and instance of the service surrogate.

For example, one service surrogate function may call multiple existing or legacy functions, or many service surrogate functions may call the same legacy component. Further, as mentioned above, a given service surrogate function does not even need to call into the existing legacy components, choosing instead to handle the calls themselves. In this way, surrogates can also become a way of migrating code from the old service to a new service application.

As will be appreciated, the above described service surrogates provide many advantageous features over existing mechanisms for providing web services for legacy components. For example, existing art requires the client and server to remain tightly coupled. This is due in part to the fact that client must use the same interface that the server implements. As such, any modification to the services or interface thereof must also be updated on the web service client.

Through the service surrogate mechanism of the present invention, however, the web service client and the services provided by legacy components are loosely coupled. Accordingly, while the service surrogate is transparent to the existing legacy service or legacy components, the surrogate interface exposed is visible to the client. The client then communicates using this surrogate interface exposed by the service surrogate. Because the web service client is abstracted from the legacy interface for the services, any modifications to the legacy components providing the services or the interfaces thereof do not require an update of the web service client. Although there may need to be some adjustments to the service surrogate in order to accommodate for the modifications to the application, such modification are minor compared to updating web service clients and/or a rewrite. In addition, these minor shims are controlled by the developer and such modifications to the service surrogate are well within the skill level and control of the developer.

Another advantageous feature of the present invention is the decoupling of interfaces. Existing art requires that the number of method calls on a web service interface match the number of method calls on the legacy or server interface. Because the use of the metadata for creating a web service creates a literal translation of the legacy interface into a web service, such literal translation (as mentioned above) may not be suitable for all services provide by the legacy components.

As previously described, the present invention allows the surrogate interface to be unrelated to the legacy interface. Accordingly, the surrogate interface may have a different number of method calls than the original interface and the service surrogate method calls may map to the existing methods in any way. As such, a developer has tighter control over the web services' interoperability, robustness, and efficiency, without requiring a rewrite of legacy components or legacy interface. Further, as previously mentioned, because the surrogate interface is decoupled from the legacy interface for communicating with the legacy components, the service surrogate can become a way of migrating code from the legacy service to a new service. In particular, because the interfaces are decoupled, over time each service can gradually be migrated from the legacy components to the service surrogate.

The present invention also advantageously provides for the decoupling of the service surrogate. Existing art, however, requires that the surrogate for an interface be associated with all instances of that interface. Nevertheless, the present invention provides that the service surrogate that serves for an existing service is only loosely coupled to that service. Service surrogates are selected on a service-by-service basis, which allows different services to have different surrogates even though those services may be backed by the same existing service or implement the same interface.

Figure 1B:
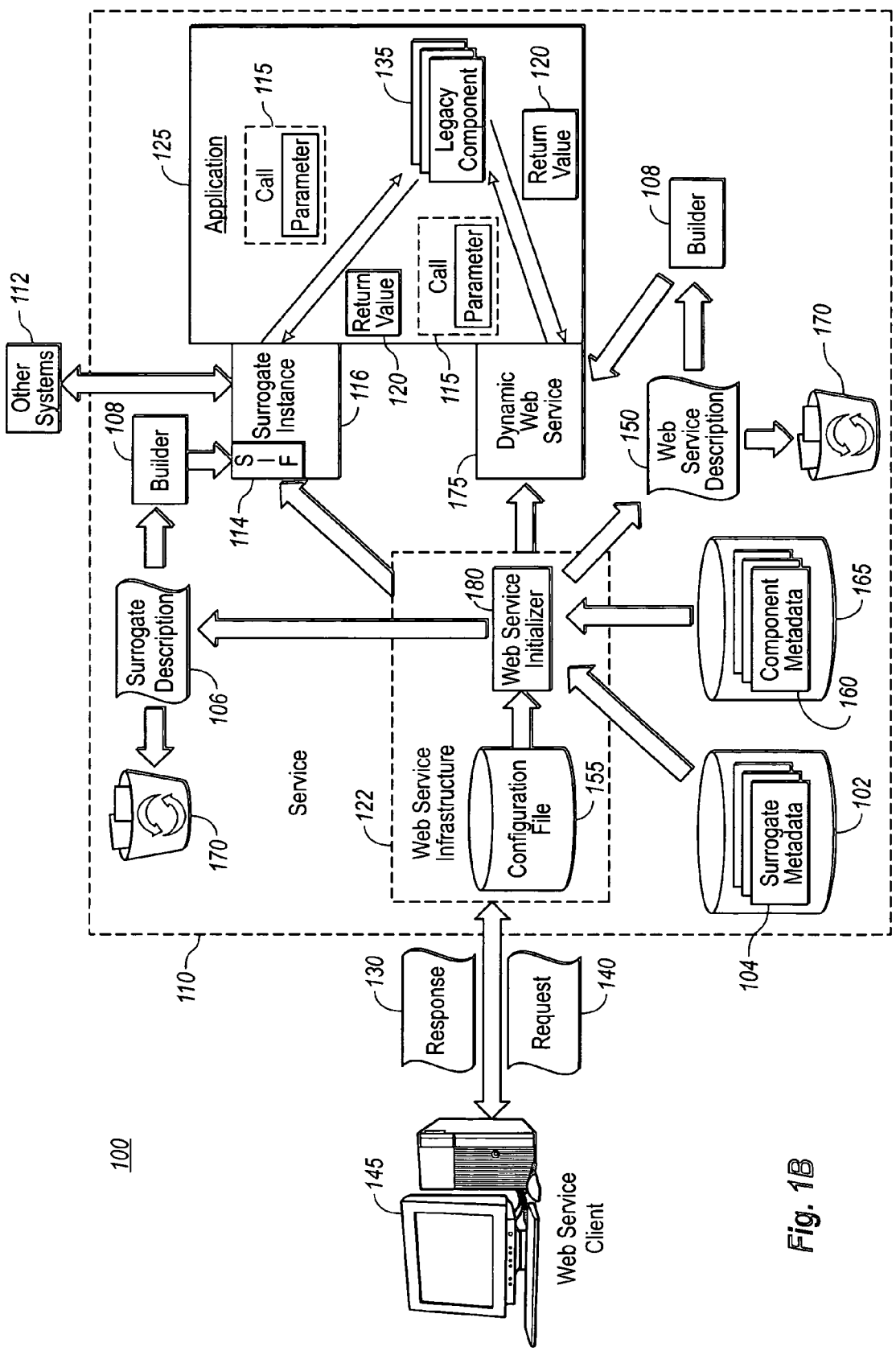
FIG. 1B illustrates a distributed system configured to provide web services via a service surrogate and dynamic web services in accordance with example embodiments of the present invention.

FIG. 1B illustrates various example embodiments of the above-described present invention. As shown, distributed system 100 provides a mechanism for generating not only a dynamic web service 175, as described above, but also generates an instance 116 of a surrogate service (referenced to herein as "surrogate instance," "instance of service surrogate," or "service surrogate instance"). For this particular embodiment, the distributed system 100 provides a web service infrastructure 122 that includes the web service initializer 180 and the configuration file 155. Upon initialization of the application 125 (or through other instances), web service initializer 180 can consult the configuration file 155 and determine that an instance 116 of the service surrogate is to be generated for one or more services provided by application 125. This configuration file 155 may include a unique identifier for identifying both the service and service surrogate to be used. Of course, other ways of identifying and locating such modules are also available to the present invention.

Note that although the instance 116 of the service surrogate is generated upon initialization of application 125, there may be other ways to initialize or generate the service surrogate instance 116. For example, the service surrogate embodiment as described herein would work equally as well in the static approach described above. Accordingly, the initialization of the instance 116 of the service surrogate upon initialization of the application 125 using web service initializer 180 is used for illustrative purposes only and is not meant to limit or otherwise narrow the scope of the present invention unless explicitly claimed. Nevertheless, the processes described above with regard to the dynamic web service 175 for initiating the application and surrogate instance 116 are also available in this embodiment. For example, the initialization of an application 125 and the surrogate interface 116 may be from receipt of a request 140 or from input from a user at the service 110.

Regardless of how the instance 116 of the service surrogate is initialized, surrogate metadata 104 is accessed similar to the component metadata 160 described above. The surrogate metadata 104 describes the service surrogate and surrogate interface 114 (referenced as "SIF") for communicating with an instance of the service surrogate 116. The surrogate metadata 104 can be accessed from the catalog database 102 and then be passed to the service infrastructure 122 for generating a surrogate description 106. This service description is in turn passed to the builder 108 for generating an instance 116 of the service surrogate and the surrogate interface 114. Note that although the builder 108 for both the surrogate instance 114 and dynamic web services 175 are shown as separate components, these builders 108 may be a single module. In fact, the builders 108 may be part of a web service infrastructure 122 or even part of the web service initializer 180. Accordingly, the location of the builder 108 modules is used for convenience and illustrative purposes and is not meant to limit or otherwise narrow the scope of the present invention unless explicitly claimed.

Once the surrogate instance 116 and surrogate interface 114 are generated, requests 140 corresponding to the services associated therewith can be received from the web service client 145. As requests messages 140 are received at the web service infrastructure 122, the web service infrastructure can identify those requests 140 (or portions thereof) that are directed to a service controlled by a service surrogate. These requests 140 are then transferred directly to the surrogate instance 116 via the surrogate interface 114. At this juncture, as previously mentioned, depending upon the configuration of the service surrogate any number of processes can be used by the surrogate instance 116 to process request 140.

For example, the surrogate instance 116 may be configured to process the request 140 without making any calls or passing any parameters to the legacy components 135, reserving all processing to internal functions. Alternatively, the surrogate instance 116 may choose to place calls and pass parameters 115 to the legacy components 135 for at least a portion of the overall request 140. Further, the surrogate instance 116 may call to other systems 112 outside the application and surrogate instance 116 in order to process any portion of the request 140. In addition, any combination of these mechanisms 116, 135, 112 for processing the request according to the surrogate instance 116 is within the scope of the present invention, depending upon the developer configuration of the custom object or service surrogate. Note also that although the other systems 112 are shown outside of the service 100, this may not be the case. For example, the other systems 112 may be other applications within service 110. Accordingly the placement of the other systems 112 outside the service 110 is for illustrative purposes only and is not meant to limit or otherwise narrow the scope of the present invention unless explicitly claimed.

Regardless of how the request message 140 is processed, similar to the dynamic web service 175, the surrogate instance 116 and/or surrogate interface 114 should know the message exchange pattern for the service in order to recognize when a return values 120 from the various components 116, 135, 112 will be received. If a return value 120 is part of the message exchange pattern, the return value 120 may be formatted in response message 130 and sent to the web service client 145. Of course, depending on the type of return value (e.g., if the return value is a simple received request OK), a response 130 to the client 145 may or may not be needed.

Note that the surrogate instance 116 sits between the surrogate interface 114 and the interface for communicating with the legacy components 135. As previously described, this advantageous feature provides for loosely coupling the web service client 145 and the existing services provided by application 125. In addition, the surrogate interface 114 is decoupled from the legacy interface for communicating with the legacy components 135. This allows for modifications within the legacy components 135, without having to upgrade client 145, as well as provides for a mechanism for migration from legacy components 135 to new services. Note, however, that although the surrogate interface 114 is shown as a separate module, the surrogate interface is an integral part of the surrogate instance 116; and can therefore be thought to be a part of the surrogate instance 116.

Note also that for other services provide by application 125 that are not supported by a surrogate service, web service initializer 180 can also produce a dynamic web service 175 instead of the service surrogate instance 116. Accordingly, literal translations of the legacy component interfaces that work well may be desired to be transposed using dynamic web service 175, wherein calls and parameters 115 are directly passed to the legacy components 135, as previously described. Accordingly, the distributed system may process requests 140 for interfaces for legacy components that translate appropriately; however, services that are otherwise inoperable or inefficient may utilize the service surrogate process described herein.

It is also noted that although the legacy client 105 from FIG. 1A is not shown, this surrogate service embodiment also provides for support for legacy client 105. Note also, that upon termination of application 125, similar to the dynamic web service 175 described above, surrogate description 106 may be deleted by sending it to the recycling bin 170 and the instance 116 of the surrogate service terminated. Accordingly, the surrogate description 112, surrogate instance 116, and surrogate interface 114 will be closed, such that a new surrogate description 106, new service surrogate instance 116, and new surrogate interface 114 will be generated upon the next initialization of the application.

Finally, note that although various components within FIG. 1B, as well as FIG. 1A, are shown in relation to one another as being separate from the web service infrastructure or other modules, exemplary embodiments are not limited to any type of configuration and or placement of modules. Accordingly, the location and configuration of the modules within FIGS. 1B and 1A are used for illustrative purposes only and are not meant to limit or otherwise narrow the scope of the present invention.

By way of brief summary of the service surrogate embodiment, service surrogates are implemented as two hooks into the web services infrastructure 122. The first hook is during service or application 125 startup. If a service surrogate is configured for a service, the web service infrastructure 122 uses the metadata 104 to build a surrogate description 106 for constructing a surrogate interface 115 to be exposed to the web service client 145. The second hook is during surrogate instance 116 creation, wherein if a service surrogate is configured then in addition to the creating a new instance of the existing application 125 or service, the infrastructure also creates a new instance 116 of the service surrogate. The web service infrastructure 122 then passes its reference for the legacy service or application 125 to the instance of the service surrogate 116 and method calls are dispatched on the service surrogate instead of application 125.

The present invention may also be described in terms of methods comprising functional steps and/or non-functional acts. The following is a description of steps and/or acts that may be preformed in practicing the present invention. Usually, functional steps describe the invention in terms of results that are accomplished whereas non-functional acts describe more specific actions for achieving a particular result. Although the functional steps and/or non-functional acts may be described or claimed in a particular order, the present invention is not necessarily limited to any particular ordering or combination of steps and/or acts. Further, the use of steps and/or acts in the recitation of the claims—and in the following description of the flowchart for FIGS. 2 and 3—is used to indicate the desired specific use of such terms.

Figure 2:
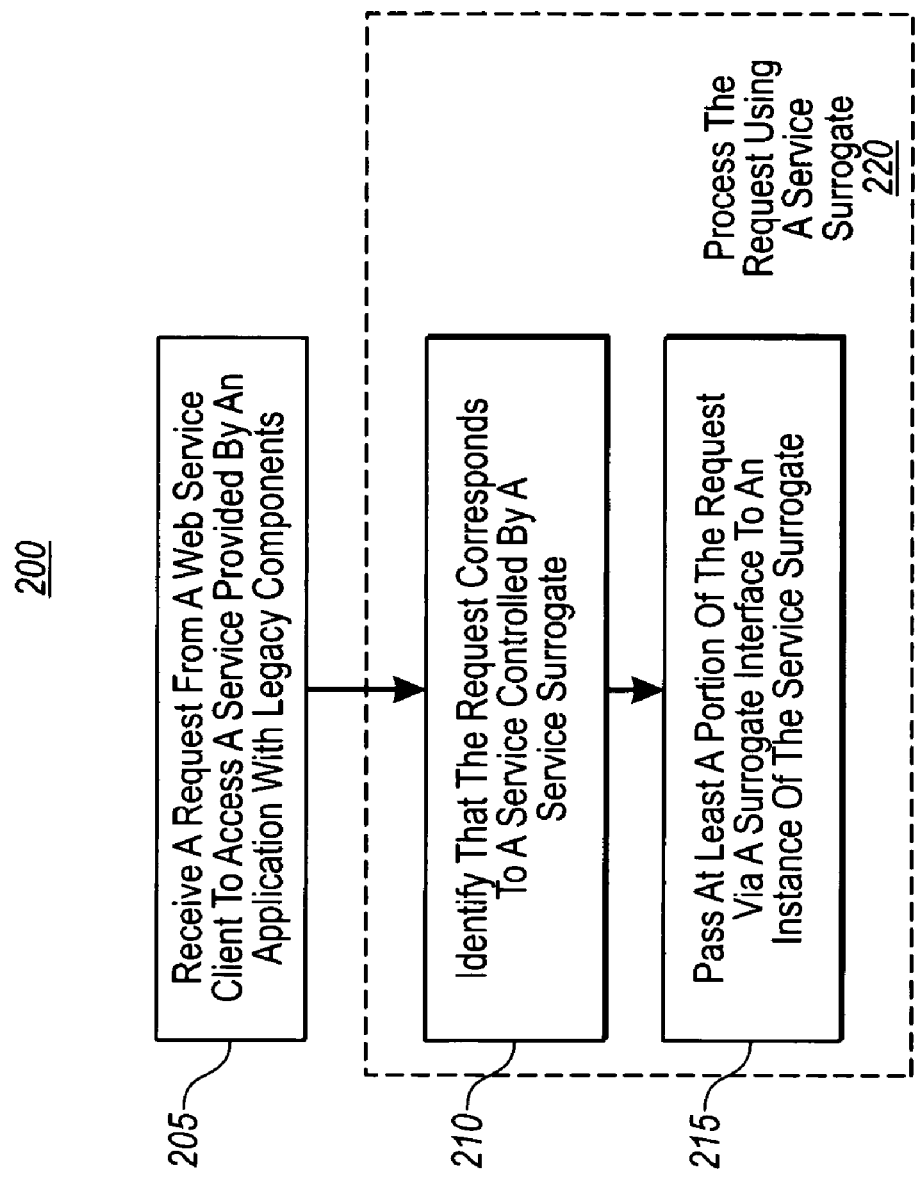
FIG. 2 illustrates a flow diagram for a method of providing web services via a custom object created by a developer in accordance with example embodiments.
Figure 3:
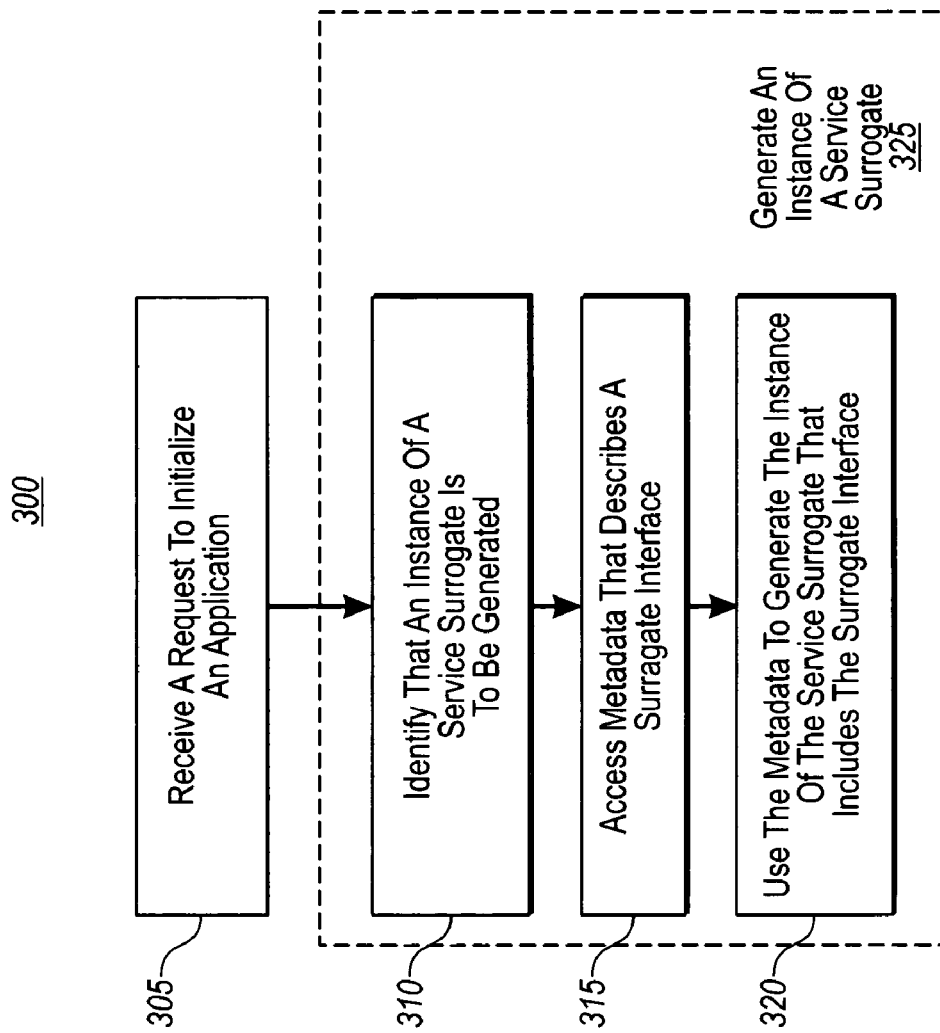
FIG. 3 illustrates a flow diagram for a method of initiating an instance of a service surrogate in accordance with example embodiments.

FIGS. 2 and 3 illustrate flow diagrams for various exemplary embodiments of the present invention. The following description of FIGS. 2 and 3 will occasionally refer to corresponding elements from FIGS. 1A and 1B. Although reference may be made to a specific element from these Figures, such elements are used for illustrative purposes only and are not meant to limit or otherwise narrow the scope of the present invention unless explicitly claimed.

FIG. 2 illustrates a flow diagram of a method 200 of providing a web service via a custom object created by a developer for legacy components that communicate via a legacy interface that is not developed to communicate in a web service environment. The custom object allows a developer tighter control over the web services inoperability, robustness, and efficiency, without requiring a rewrite of the legacy components. Method 200 includes an act of receiving 205 a request from a web service client to access a service provided by an application with legacy components. For example, a request 140 may be received from web service client 145 at the web service infrastructure 122 in order to access a service provided by application 125 with legacy components 135, which communicate using a legacy interface that is not developed to communicate in a web service environment.

Thereafter, method 200 includes a step for processing 220 the request using a service surrogate. More particularly, step for 220 includes an act of identifying 210 that the request corresponds to a service controlled by a service surrogate. For example, when request 140 is received at the web service infrastructure 122, it may be identified as corresponding to a service surrogate, which is a custom object created by a developer to expose a surrogate interface 114 as an abstraction between the web service client 145 and the legacy interface.

Step for 220 also includes an act of passing 215 at least a portion of the request via a surrogate interface to an instance of the service surrogate. For example, web service infrastructure 122 upon receiving request 140 may pass at least a portion of the request 140 via the surrogate interface 114 to an instance 116 of the service surrogate for further processing. The instance 116 of the service surrogate may be configured to process at least a portion of the request by one or more of a call into the one or more legacy components 135, a call into the instance 116 of the service surrogate, or a call into other systems 112 outside the application and the service surrogate.

Note that the instance 116 of the service surrogate may be generated upon initialization of the application 125. In such instance, the above method may also include an act of receiving a request to stop the application 125. Based on the request to stop the application 125, the instance 116 of the service surrogate may also be automatically stopped. Further, the service surrogate description 106 may also be deleted such that a new instance 116 of the service surrogate and new surrogate description 106 will be generated upon the next initialization of the application 125.

Regardless of when the instance 116 of the service surrogate is generated, a surrogate description 106 may be used to generate the instance 116 of the service surrogate and the surrogate interface 114, wherein the surrogate description 106 describes one or more of a call operation, a parameter, or a message exchange pattern for communicating with the one or more legacy components 135, the instance 116 of the service surrogate, or other systems 112 outside the application 125 and the instance 116 of the service surrogate.

When the surrogate interface 114 is created based on a surrogate description 106 in accordance with surrogate metadata 104, the above method may further include the following. Based on the surrogate description 106 a message exchange pattern may be identified for the one or legacy components 135 that requires a response to the web service client 145. As such, one or more return values 120 may be received from one or more of the one or more legacy components, the instance of the service surrogate 116, or the other systems 112 outside the application 125 and the instance 116 of the service surrogate 116. Thereafter, the instance of the service surrogate 116 may be used to format the one or more return values 120 into a response 130, which is then sent to the web service client 145 for further processing.

Further note that the service surrogate or instance thereof 116 can be used in conjunction with the dynamic web service 175 such that other services for application 125 provided by the legacy components 135 can utilize the dynamic web service 175 as described herein. In such instance, an interface description for the legacy interface as described within the component metadata 160 may be used to generate a dynamic web service 175 for another service provided by the application 125 with the one or more legacy components 135. The dynamic web service 175 being generated at the initialization of application 125, and wherein the dynamic web service 175 is a literal translation of the legacy interface. In such instance, another service request message 140 maybe received corresponding to via another server. The web service request message 140 may include one or more parameters 115 and one or more operations for requesting services offered by the one or more legacy components 135. Thereafter, the dynamic web service 175 is used to make one or more legacy calls 115 to the one or more legacy components 135. The one or more parameters 115 may then be passed to the one or more legacy components 135 for further processing.

Other exemplary embodiments provide that based on the legacy interface description, a message exchange pattern may be identified for the one or more legacy components 135 such that a response 130 to the web service client 145 is required. In such instance, one or more return values 120 may be received from the one or more legacy components 135, wherein the dynamic web service 175 is used to format the return values 120 into a web service response message 130. Thereafter, the web service response message 130 is sent to the web service client 145 for further processing.

FIG. 3 illustrates a flow diagram of a method 300 for providing initialization of a custom object that was created by a developer for one or more legacy components that communicate via a legacy interface that is not developed to communicate in a web service environment. Method 300 includes an act of receiving 305 the request to initialize an application. For example, service 110 may receive a request to initialize application 125, which includes legacy components 135 for providing a service. The legacy components 135 communicate using a legacy interface that is not developed to communicate in a web service environment. The request to initialize the application may be received in response to a service request message 140 from the web services client 145. Alternatively, the request to initialize the application 125 may be receive in response to input from a user interface at the service 110 computing device.

Based on the request to initialize the application, method 300 also includes a step for generating 325 an instance of a service surrogate. In particular, step for 325 includes an act of identifying 310 that an instance of a service surrogate is to be generated. For example, upon initialization of application 125, web services initializer 180 may consult a configuration file 155 that includes, e.g., a unique identifier and other information for indicating that an instance 116 of a service surrogate is to be generated upon initialization of application 125. The service surrogate being a custom object created by a developer to expose a surrogate interface 114 as an abstraction between a web service client 145 and the legacy interfaces. Step for 325 also includes an act of accessing 315 metadata that describes a surrogate interface. For example, the surrogate metadata 104 can be accessed from the catalog database 102 that describes the surrogate interface 114, which will be exposed to the web service client 145.

Thereafter, step for 325 includes an act of using 320 the metadata to generate the instance of the service surrogate that includes the surrogate interface. In particular, web service initializer 180 can use the surrogate metadata 104 to generate the instance 116 of the service surrogate that includes the surrogate interface 114. The instance 116 of the service surrogate is configured to process at least a portion of a request 140 from the web service client 125 by one or more of a call into the one or more legacy components 135, a call into the instance 116 of the service surrogate, or a call into other systems 112 outside the application 125 and the instance 116 of the service surrogate.

The surrogate metadata 104 may also be used to first generate a surrogate description 106, which is then used to generate the instance 116 of the service surrogate and the surrogate interface 114. The surrogate description 106 describes one or more of a call operation, a parameter, or a message exchange pattern for communicating with the one or more legacy components 135, the instance 116 of the service surrogate, or the other systems 112 outside the application 125 and the instance 116 of the service surrogate. The surrogate description 106 may be a WSDL document.

Further, based on the surrogate description 106, it may be identified that a message exchange pattern for the one or more legacy components 135 requires a response 130 to the web service client 145. Thereafter, one or more return values 120 may be received from one or more of the one or more legacy components 135, the instance 116 of the service surrogate, or the other systems 112 outside the application 125 and the instance 116 of the service surrogate. The instance 116 of the service surrogate may be used to format the one or more return values 120 into a web services response message 130. The web service response message 130 can then be sent to the web service client 145 for further processing.

Other exemplary embodiments provide that the dynamic web service 175 can be run in conjunction with the surrogate instance 116. In this embodiment, an interface description from component metadata 160 is used to generate the dynamic web service 175 for another service provided by the application 125 with the legacy components 135. The dynamic web service 175 generated at the initialization of the application 125 is a literal translation of the legacy interface. In this embodiment, another service request message 140 may be received corresponding to the another service. The web service request message 140 may include one or more parameters (if any) and one or more operations for requesting services offered by the one or more legacy components 135. The dynamic web service 175 is then used to make one or more legacy calls 115 to the legacy components 135. The parameters 115 may then be passed to one or more of the legacy components 135 for further processing.

The above exemplary embodiments also provide that based on the legacy interface description from component metadata 160, a message exchange pattern is identified for the legacy components 135, which requires a response 130 to the web service client 145. Thereafter, one or more return values 120 may be received from the legacy components 135, wherein the dynamic web services 175 is used to format the return values 120 into a web service response message 130. The web service response message 130 may then be sent to the web service client 145 for further processing. The web service request message 140 and the web service response 130, as well as other documents described herein, may be XML documents.

In the instance that both the dynamic web service 175 and surrogate instance are running simultaneously, other exemplary embodiments provide for receiving a request to stop the application 125 where upon the instance 116 of the service surrogate and the dynamic web server 175 are automatically stopped or terminated. Further, the surrogate description 106 and the web service description 150 are deleted such that a new instance 116 of the service surrogate, a new dynamic web service 175, a new surrogate description 106, and a new web service description 150 will be generated upon the next initialization of the application 125.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable storage media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 4:
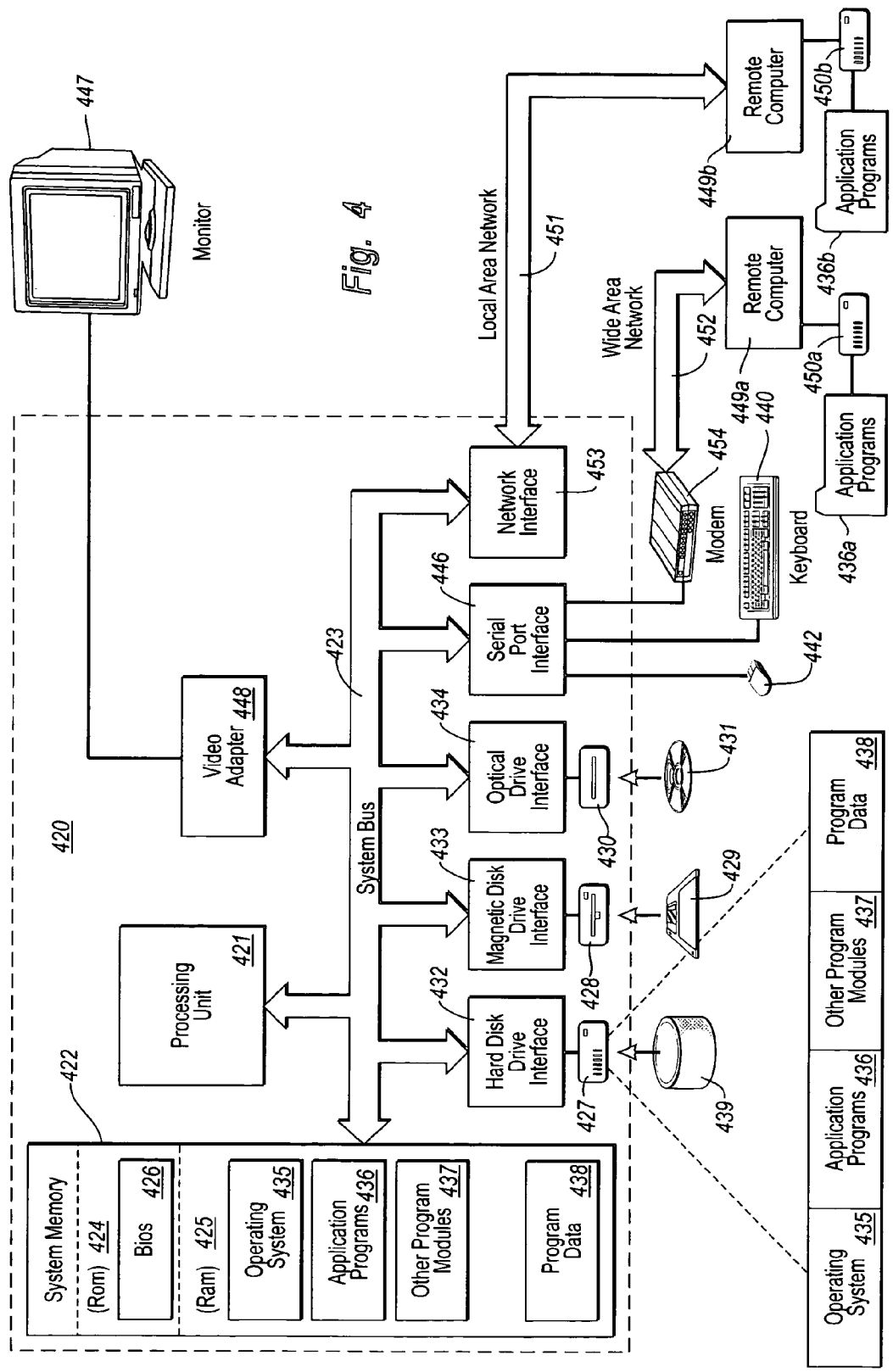
FIG. 4 illustrates an example system that provides a suitable operating environment for the present invention.

FIG. 4 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by and remote processing devices that are linked (either by hardwired links, wireless links, or by a combination of hardwired or wireless links) through a communications network. In a distributed computing environment, program modules may be located in both and remote memory storage devices.

With reference to FIG. 4, an exemplary system for implementing the invention includes a general purpose computing device in the form of a conventional computer 420, including a processing unit 421, a system memory 422, and a system bus 423 that couples various system components including the system memory 422 to the processing unit 421. The system bus 423 may be any of several types of bus structures including a memory bus or memory controller, a peripheral bus, and a bus using any of a variety of bus architectures. The system memory includes read only memory (ROM) 424 and random access memory (RAM) 425. A basic input/output system (BIOS) 426, containing the basic routines that help transfer information between elements within the computer 420, such as during start-up, may be stored in ROM 424.

The computer 420 may also include a magnetic hard disk drive 427 for reading from and writing to a magnetic hard disk 439, a magnetic disk drive 428 for reading from or writing to a removable magnetic disk 429, and an optical disk drive 430 for reading from or writing to removable optical disk 431 such as a CD-ROM or other optical media. The magnetic hard disk drive 427, magnetic disk drive 428, and optical disk drive 430 are connected to the system bus 423 by a hard disk drive interface 432, a magnetic disk drive interface 433, and an optical drive interface 434, respectively. The drives and their associated computer-readable media provide nonvolatile storage of computer-executable instructions, data structures, program modules and other data for the computer 420. Although the exemplary environment described herein employs a magnetic hard disk 439, a removable magnetic disk 429 and a removable optical disk 431, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 439, magnetic disk 429, optical disk 431, ROM 424 or RAM 425, including an operating system 435, one or more application programs 436, other program modules 437, and program data 438. A user may enter commands and information into the computer 420 through keyboard 440, pointing device 442, or other input devices (not shown), such as a microphone, joy stick, game pad, satellite dish, scanner, or the like. These and other input devices are often connected to the processing unit 421 through a serial port interface 446 coupled to system bus 423. Alternatively, the input devices may be connected by other interfaces, such as a parallel port, a game port or a universal serial bus (USB). A monitor 447 or another display device is also connected to system bus 423 via an interface, such as video adapter 448. In addition to the monitor, personal computers typically include other peripheral output devices (not shown), such as speakers and printers.

The computer 420 may operate in a networked environment using logical connections to one or more remote computers, such as remote computers 449a and 449b. Remote computers 449a and 449b may each be another personal computer, a server, a router, a network PC, a peer device or other common network node, and typically include many or all of the elements described above relative to the computer 420, although only memory storage devices 450a and 450b and their associated application programs 436a and 436b have been illustrated in FIG. 4. The logical connections depicted in FIG. 4 include a area network (LAN) 451 and a wide area network (WAN) 452 that are presented here by way of example and not limitation. Such networking environments are commonplace in office-wide or enterprise-wide computer networks, intranets and the Internet.

When used in a LAN networking environment, the computer 420 is connected to the network 451 through a network interface or adapter 453. When used in a WAN networking environment, the computer 420 may include a modem 454, a wireless link, or other means for establishing communications over the wide area network 452, such as the Internet. The modem 454, which may be internal or external, is connected to the system bus 423 via the serial port interface 446. In a networked environment, program modules depicted relative to the computer 420, or portions thereof, may be stored in the remote memory storage device. It will be appreciated that the network connections shown are exemplary and other means of establishing communications over wide area network 452 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a service computing device in a distributed system, a method of providing web services via a custom object created by a developer for legacy components that communicate via a legacy interface that is not developed to communicate in a web service environment, the custom object allowing a developer control over the web services' interoperability, robustness, and efficiency, without requiring a rewrite of the legacy components, the method comprising:

receiving from a web service, a request to access a service provided by an application with one or more legacy components which communicate using a legacy interface that is not developed to communicate in a web service environment;

identifying that the request corresponds to a service controlled by a service surrogate which is a custom object created by a developer to expose a surrogate interface as an abstraction between the web service client and the legacy interface, the surrogate interface being created based on a surrogate description;

accessing surrogate metadata, the surrogate metadata describing the service surrogate and a surrogate interface for communicating with an instance of the service surrogate;

accessing component metadata, the component metadata describing calls which may be passed to the one or more legacy components, parameters which may be passed to the one or more legacy components, and the order in which parameters are to be passed;

passing at least a portion of the request via the surrogate interface to an instance of the service surrogate;

the instance of the service surrogate processing at least a portion of the request by one or more of a call into the one or more legacy components, a call into the instance of the service surrogate, or a call into other systems outside the application and the service surrogate;

based on the surrogate description, identifying that a message exchange pattern for the one or more legacy components requires a response to the web service client;

receiving one or more return values from one or more of the one or more legacy components, the instance of the service surrogate, or the other systems outside the application and the instance of the service surrogate;

using the instance of the of the service surrogate to format the one or more return values into a web service response message; and sending the web service response message to the web service client for further processing.

2. The method of claim 1, wherein the service surrogate was generated upon a request to initialize the application.

3. The method of claim 2, wherein a surrogate description is used to generate the instance of the service surrogate and the surrogate interface, wherein the surrogate description describes one or more of a call operation, a parameter, or a message exchange pattern for communicating with the one or more legacy components, the instance of the service surrogate, or the other systems outside the application and the instance of the service surrogate.

4. The method of claim 3, further comprising the acts of:

receiving a request to stop the application;

based on the request to stop the application, automatically stopping the instant of the service surrogate; and deleting the surrogate description such that a new instance of the service surrogate and a new surrogate description will be generated upon the next initialization of the application.

5. The method of claim 1, wherein based on an interface description for the legacy interface, a dynamic web service is generated for another service provided by the application with the one or more legacy components, the dynamic web service generated at the initialization of the application, and wherein the dynamic web service is a literal translation of the legacy interface, the method further comprising acts of:

receiving another service request message corresponding to the another service, the web service request message including one or more parameters and one or more operations for requesting services offered by the one or more legacy components;

using the dynamic web service to make one or more calls to the one or more legacy components; and passing the one or more parameters to one or more of the one or more legacy components for further processing.

6. The method of claim 5, further comprising acts of:

based on the dynamic legacy interface description, identifying that a message exchange pattern for the one or more legacy components requires a response to the web service client;

receiving one or more return values from the one or more legacy components;

using the web service to format the return values into a web service response message; and sending the web service response message to the web service client for further processing.

7. At a service computing device in a distributed system, a method of initializing a custom object that was created by a developer for one or more legacy components that communicate via a legacy interface that is not developed to communicate in a web service environment, the custom object allowing the developer control over the web services' interoperability, robustness, and efficiency, without requiring a rewrite of the one or more legacy components, the method comprising acts of:

receiving a request to initialize an application, the application including one or more legacy components for providing a service, wherein the one or more legacy components communicate using a legacy interface that is not developed to communicate in a web service environment;

based on the request to initialize the application, identifying that an instance of a service surrogate is to be generated, the service surrogate being a custom object created by a developer to expose a surrogate interface as an abstraction between a web service client and the legacy interface;

accessing surrogate metadata, the surrogate metadata describing the service surrogate and a surrogate interface for communicating with an instance of the service surrogate;

accessing component metadata, the component metadata describing calls which may be passed to the one or more legacy components, parameters which may be passed to the one or more legacy components, and the order in which parameters are to be passed;

using the surrogate metadata to generate a surrogate description;

using the surrogate description to generate an instance of the service surrogate and a surrogate interface;

wherein the instance of the service surrogate is configured to process at least a portion of a request from the web service client by one or more of a call into the one or more legacy components, a call into the instance of the service surrogate, or a call into other systems outside the application and the instance of the service surrogate;

based on the surrogate description, identifying that a message exchange pattern for the one or more legacy components requires a response to the web service client;

receiving one or more return values from one or more of the one or more legacy components, the instance of the service surrogate, or the other systems outside the application and the instance of the service surrogate;

using the instance of the of the service surrogate to format the one or more return values into a web service response message; and sending the web service response message to the web service client for further processing.

8. The method of claim 7, wherein the request to initialize the application is received in response to the service request message from the web service client.

9. The method of claim 7 wherein the request to initialize the application is received in response to input from a user interface at the service computing device.

10. The method of claim 1, wherein the surrogate description describes one or more of a call operation, a parameter, or a message exchange pattern for communicating with the one or more legacy components, the instance of the service surrogate, or the other systems outside the application and the instance of the service surrogate.

11. The method of claim 1, wherein the surrogate description is a WSDL document.

12. The method of claim 1, further comprising acts of:

based on the surrogate description, identifying that a message exchange pattern for the one or more legacy components requires a response to the web service client;

receiving one or more return values from one or more of the one or more legacy components, the instance of the service surrogate, or the other systems outside the application and the instance of the service surrogate;

using the instance of the of the service surrogate to format the one or more return values into a web service response message; and sending the web service response message to the web service client for further processing.

13. The method of claim 1, wherein based on an interface description for the legacy interface, a dynamic web service is generated for another service provided by the application with the one or more legacy components, the dynamic web service generated at the initialization of the application, and wherein the dynamic web service is a literal translation of the legacy interface, the method further comprising acts of:

receiving another service request message corresponding to the another service, the another service request message including one or more operations for requesting the another service offered by the one or more legacy components; and based on the one or more operations, using the dynamic web service to make one or more calls to the one or more legacy components.

14. The method of claim 13, wherein the web service request message further includes one or more parameters, the method further comprising an act of:

passing the one or more parameters to one or more of the one or more legacy components for further processing.

15. The method of claim 14, further comprising acts of:
  based on the legacy interface description, identifying that a message exchange pattern for the one or more legacy components requires a response to the web service client;
  receiving one or more return values from the one or more legacy components;
  using the dynamic web service to format the return values into a web service response message; and
  sending the web service response message to the web service client for further processing.

16. The method of claim 15, further comprising the acts of:
  receiving a request to stop the application;
  based on the request to stop the application, automatically stopping the instance of the service surrogate and the dynamic web service; and
  deleting the surrogate description and the web service description such that a new instance of the service surrogate, a new dynamic web service, a new surrogate description, and a new web service description will by generated upon the next initialization of the application.

17. The method of claim 7, further comprising the acts of:
  receiving a request to stop the application;
  based on the request to stop the application, automatically stopping the instant of the service surrogate; and
  deleting the surrogate description such that a new instance of the service surrogate and a new surrogate description will by generated upon the next initialization of the application.

18. At a service computing device in a distributed system, a computer program product for implementing a method of initializing a custom object that was created by a developer for one or more legacy components that communicate via a legacy interface that is not developed to communicate in a web service environment, the custom object allowing the developer control over the web services' interoperability, robustness, and efficiency, without requiring a rewrite of the one or more legacy components, the computer program product comprising one or more physical computer readable storage media having stored thereon computer executable instructions that, when executed by a processor, can cause the distributed computing system to perform the method of claim 7.

19. At a service computing device in a distributed system, a method of providing web services via a custom object created by a developer for legacy components that communicate via a legacy interface that is not developed to communicate in a web service environment, the custom object allowing a developer control over the web services' interoperability, robustness, and efficiency, without requiring a rewrite of the legacy components, the method comprising:
  receiving from a web service, a request to access a service provided by an application with one or more legacy components which communicate using a legacy interface that is not developed to communicate in a web service environment; identifying that the request corresponds to a service controlled by a service surrogate which is a custom object created by a developer to expose a surrogate interface as an abstraction between the web service client and the legacy interface;
  accessing surrogate metadata, the surrogate metadata describing the service surrogate and a surrogate interface for communicating with an instance of the service surrogate;
  accessing component metadata, the component metadata describing calls which may be passed to the one or more legacy components, parameters which may be passed to the one or more legacy components, and the order in which parameters are to be passed;
  passing at least a portion of the request via the surrogate interface to an instance of the service surrogate;
  the instance of the service surrogate processing at least a portion of the request by one or more of a call into the one or more legacy components, a call into the instance of the service surrogate, or a call into other systems outside the application and the service surrogate;
  receiving a request to stop the application;
  based on the request to stop the application, automatically stopping the instant of the service surrogate;
  deleting the surrogate description such that a new instance of the service surrogate and a new surrogate description will be generated upon the next initialization of the application;
  wherein the service surrogate was generated upon a request to initialize the application; and
  wherein a surrogate description is used to generate the instance of the service surrogate and the surrogate interface, wherein the surrogate description describes one or more of a call operation, a parameter, or a message exchange pattern for communicating with the one or more legacy components, the instance of the service surrogate, or the other systems outside the application and the instance of the service surrogate.

\* \* \* \* \*

UNITED STATES PATENT AND TRADEMARK OFFICE
CERTIFICATE OF CORRECTION

PATENT NO.         : 7,593,994 B2                                    Page 1 of 1
APPLICATION NO.    : 11/074619
DATED              : September 22, 2009
INVENTOR(S)        : Andrew D. Milligan et al.

It is certified that error appears in the above-identified patent and that said Letters Patent is hereby corrected as shown below:

On the Title Page, Item (57), under "Abstract" line 10, delete "a," and insert -- a --, therefor.

In page 2, Item (56), under "Other Publications" line 11, below "interscience.wiley.com)." insert
-- Office Action dated 12/11/07 cited in Application No. 11/075,417.
Office Action dated 07/16/08 cited in Application No. 11/075,417.
Office Action dated 12/19/08 cited in Application No. 11/075,417. --.

In column 5, line 35, after "present" insert -- invention will become more fully apparent from the following description and appended --.

In column 15, line 54, after "instance" insert -- 116 --.

In column 18, line 49, in Claim 1, delete "of the of the" and insert -- of the --, therefor.

In column 20, line 13, in Claim 7, delete "of the of the" and insert -- of the --, therefor.

In column 20, line 42, in Claim 12, delete "of the of the" and insert -- of the --, therefor.

In column 21, line 20, in Claim 16, delete "by" and insert -- be --, therefor.

Signed and Sealed this
Twenty-fifth Day of January, 2011

David J. Kappos
*Director of the United States Patent and Trademark Office*